United States Patent
Ikeda et al.

(10) Patent No.: US 9,983,689 B2
(45) Date of Patent: May 29, 2018

(54) KEY INPUT UNIT AND ELECTRONIC APPARATUS

(71) Applicant: Murata Manufacturing Co., Ltd., Nagaokakyo-shi, Kyoto-fu (JP)

(72) Inventors: Naoto Ikeda, Nagaokakyo (JP); Jerry Hsieh, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 799 days.

(21) Appl. No.: 14/449,175

(22) Filed: Aug. 1, 2014

(65) Prior Publication Data

US 2014/0340315 A1  Nov. 20, 2014

Related U.S. Application Data

(63) Continuation of application No. PCT/JP2014/052022, filed on Jan. 30, 2014.

(30) Foreign Application Priority Data

Mar. 8, 2013 (JP) .................................. 2013-047351

(51) Int. Cl.
 *H03K 17/94* (2006.01)
 *H04Q 5/22* (2006.01)
 (Continued)

(52) U.S. Cl.
 CPC ............ *G06F 3/021* (2013.01); *G06F 1/1662* (2013.01); *G06F 1/1698* (2013.01);
 (Continued)

(58) Field of Classification Search
 CPC combination set(s) only.
 See application file for complete search history.

(56) References Cited

U.S. PATENT DOCUMENTS 5,764,197 A * 6/1998 Tsuru ...................... H01Q 1/38
343/702
6,184,805 B1 * 2/2001 Uggmark ............... H03M 11/24
341/20
(Continued)

FOREIGN PATENT DOCUMENTS

JP  2006-039508 A  2/2006
JP  2006-085288 A  3/2006
(Continued)

OTHER PUBLICATIONS

Official Communication issued in International Patent Application No. PCT/JP2014/052022, dated Feb. 25, 2014.

*Primary Examiner* — Brian Zimmerman
*Assistant Examiner* — Cal Eustaquio
(74) *Attorney, Agent, or Firm* — Keating & Bennett, LLP (57) ABSTRACT

A coil antenna is provided on an inner surface of a key-top of a key input unit. A power supply coil that is magnetically coupled to the coil antenna and an RFIC are mounted on a substrate holding key switches. A device including an NFC is arranged closer to the key-top so as to make communication with the NFC. Further, a tag of an RFID is arranged closer thereto so as to be read. Thus, a key input unit and an electronic apparatus are configured in which an antenna is not provided on a housing externally and is less influenced by the housing of the electronic apparatus into which the antenna is incorporated.

16 Claims, 11 Drawing Sheets

(51) Int. Cl.
 *G06F 3/02* (2006.01)
 *H04B 5/00* (2006.01)
 *G06K 7/10* (2006.01)
 *G06F 1/16* (2006.01)
 *H01H 13/70* (2006.01)

(52) U.S. Cl.
 CPC ....... *G06F 3/0202* (2013.01); *G06K 7/10336* (2013.01); *H01H 13/70* (2013.01); *H04B 5/0037* (2013.01)

(56) References Cited

U.S. PATENT DOCUMENTS

| | | | |
|---|---|---|---|
| 2005/0285760 A1* | 12/2005 | Okada | G09B 13/04 341/22 |
| 2008/0297313 A1* | 12/2008 | Kinkenzeller | G06F 21/10 340/10.1 |
| 2011/0122016 A1* | 5/2011 | Lomes | H01Q 3/267 342/174 |
| 2012/0199461 A1* | 8/2012 | Shim | B60R 25/00 200/52 R |
| 2012/0313868 A1 | 12/2012 | Kuromatsu | |

FOREIGN PATENT DOCUMENTS

| | | |
|---|---|---|
| JP | 2007-256354 A | 10/2007 |
| JP | 2010-102531 A | 5/2010 |
| JP | 2012-256244 A | 12/2012 |
| WO | 2007/000807 A1 | 1/2007 |

* cited by examiner

KEY INPUT UNIT AND ELECTRONIC APPARATUS

BACKGROUND OF THE INVENTION

1. Field of the Invention

The present invention relates to a key input unit including an antenna that is preferably used for an RFID system, a near field communication system (NFC), and the like, and an electronic apparatus including the key input unit.

2. Description of the Related Art

A coil antenna appropriate for a high frequency (HF) band is generally used for an NFC antenna. Japanese Unexamined Patent Application Publication No. 2010-102531 describes the configuration in which such coil antenna is provided in a housing of an electronic apparatus. Japanese Unexamined Patent Application Publication No. 2006-85288 describes an external RFID communication device that is used by attaching an antenna unit with a USB connector to a USB terminal of a notebook PC. Further, WO 2007/000807 describes a tag that is bonded to a metal housing of the notebook PC and that makes communication.

In an information processing apparatus described in Japanese Unexamined Patent Application Publication No. 2010-102531, an NFC antenna module is arranged between a touch pad of a notebook PC and a bottom plate metal portion provided under the touch pad. The NFC antenna module performs near field communication with an IC card if the IC card is held in the vicinity of the touch pad.

If the touch pad uses an electrostatic capacity system, for example, a large number of metal patterns such as capacitor patterns are incorporated therein. The metal patterns inhibit formation of a magnetic field of the NFC coil antenna, resulting in a problem that preferable antenna characteristics are not obtained easily. In recent years, the metal housing tends to be widely used as a result of putting emphasis on strength and design. Due to this, it becomes difficult to arrange the coil antenna at a position at which the coil antenna is not subject to an electromagnetic shield action.

The external RFID communication device described in Japanese Unexamined Patent Application Publication No. 2006-85288 is a projecting attachment with respect to the notebook PC. Therefore, if impact due to dropping or the like is applied to the projecting portion, the external RFID communication device is easy to be broken.

In the tag as described in WO 2007/000807, a tag (antenna) projects from the metal housing. Due to this, operability is inhibited and the tag is easy to be peeled off.

SUMMARY OF THE INVENTION

Preferred embodiments of the present invention enable an antenna to be less influenced by a housing of an electronic apparatus into which the antenna is incorporated without externally providing the antenna on the housing.

Various preferred embodiments of the present invention provide an apparatus that can use a key input unit as an RFID antenna or an NFC antenna, for example.

A key input unit according to a preferred embodiment of the present invention includes a plurality of key switches each of which includes a key operating portion and a switch portion configured to detect displacement of the key operating portion (key-top). In the key input unit, at least one of the key operating portions of the plurality of key switches includes a coil antenna to which an RFIC is connected directly or indirectly.

With the above-mentioned configuration, the key input unit is not covered by a metal housing, thus solving a problem of an eddy current generated due to the metal housing.

It is preferable that a winding axis of the coil antenna be perpendicular or substantially perpendicular to an operation surface of the key operating portion. This enables the operation surface of the key operating portion or the operation surface of the key input unit to be used as a communication surface.

It is preferable that the RFIC and a power supply coil which is connected to the RFIC and magnetically coupled to the coil antenna be arranged on a substrate on which the switch portions configured to detect operations (displacement) of the key operating portions are provided. This configuration eliminates the necessity of a special substrate for mounting the RFIC.

It is preferable that when the power supply coil which is connected to the RFIC and magnetically coupled to the coil antenna is included, the power supply coil be arranged on a substrate on which the switch portions configured to detect operations (displacement) of the key operating portions are provided. This configuration eliminates the necessity of a special substrate for mounting the power supply coil.

It is preferable that the key operating portions include a plurality of character keys and the key operating portion including the coil antenna be the key operating portion having a size larger than the character keys. This increases the coil diameter of the coil antenna, thus obtaining high gain.

It is preferable that each of a first key operating portion and a second key operating portion among the plurality of key operating portions include the coil antenna, and the first key operating portion and the second key operating portion be connected in series or in parallel. This increases the substantial coil diameter of the coil antenna, thus obtaining high gain.

It is preferable that the coil antenna of the first key operating portion and the coil antenna of the second key operating portion be wound and connected such that magnetic fields which are generated on the respective coil antennas have the same phase. With this, a relatively wide range of the operation surface of the key input unit is preferably used as the communication surface.

An electronic apparatus according to another preferred embodiment of the present invention includes a display portion and a key input portion. In the electronic apparatus, the key input portion preferably includes the key input unit according to any one of the above-mentioned preferred embodiments of the present invention.

According to various preferred embodiments of the present invention, a communication circuit including a coil antenna, an RFIC, and the like can use a key input unit as an RFID system or an NFC reading device. That is to say, communication is performed in a state where an RFID medium or a communication party which performs communication with the NFC is made closer to the key input unit.

The key input unit is not covered by a metal housing, thus eliminating a problem of an eddy current being generated due to the metal housing. In addition, the antenna is not required to be provided on the housing externally, thus preventing damage due to impact and the like and lowering in operability.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is an exploded perspective view of a communication circuit including a coil antenna 10, a power supply coil 20, an RFIC 40, and the like.

DETAILED DESCRIPTION OF THE PREFERRED EMBODIMENTS

First Preferred Embodiment

Figure 1A:
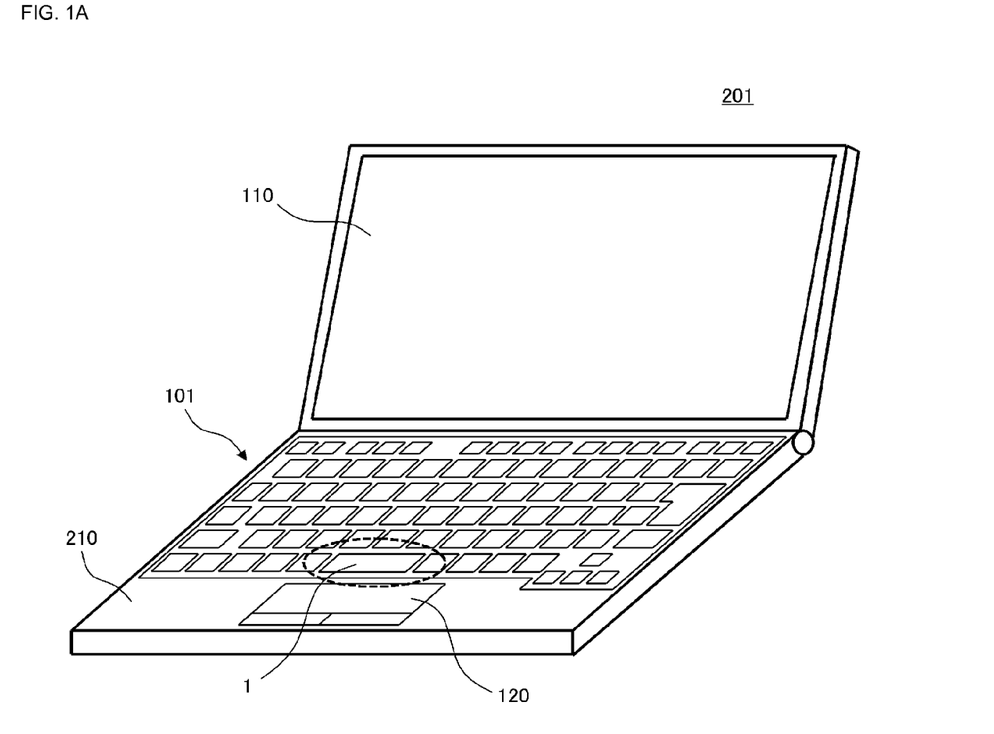
FIG. 1A is an outer perspective view of a notebook PC 201 as an example of an electronic apparatus according to a first preferred embodiment of the present invention and FIG. 1B is a partial perspective view of a key input unit thereof.
Figure 1B:
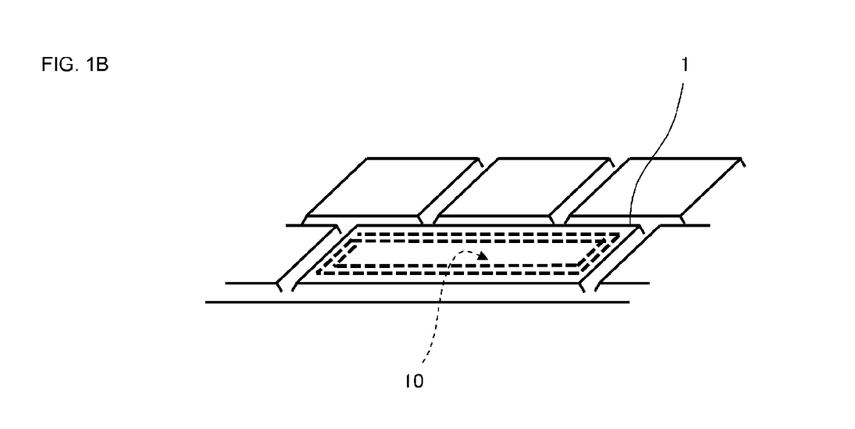

FIG. 1A is an outer perspective view of a notebook PC 201 as an example of an electronic apparatus according to a first preferred embodiment of the present invention and FIG. 1B is a partial perspective view of a key input unit thereof. The notebook PC 201 includes a key input unit 101, a touch pad 120, a display unit 110, and the like. The key input unit 101 is arranged such that an operation surface thereof is exposed to an opening of a housing 210 of the notebook PC 201.

As illustrated in FIG. 1B, a coil antenna 10 is provided in one key-top 1 of the key input unit. The key-top 1 corresponds to a "key operating portion". In this example, the key-top 1 is a key-top of a SPACE key having a size larger than normal character keys.

Figure 2A:
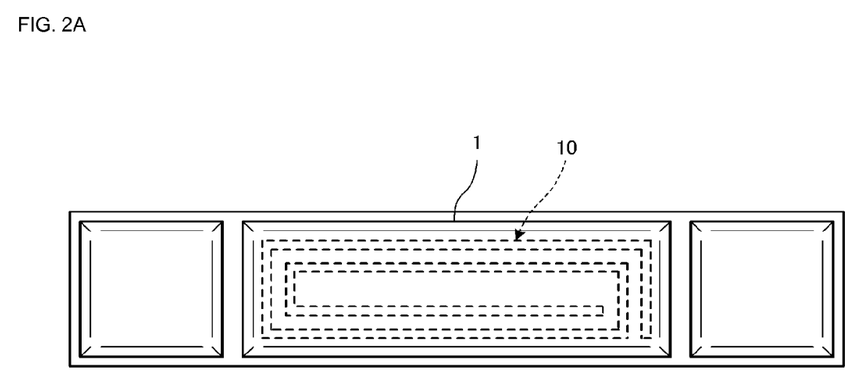
FIG. 2A is a plan view of key-tops of a SPACE key and other different keys at the right and left sides of the SPACE key.
Figure 2B:
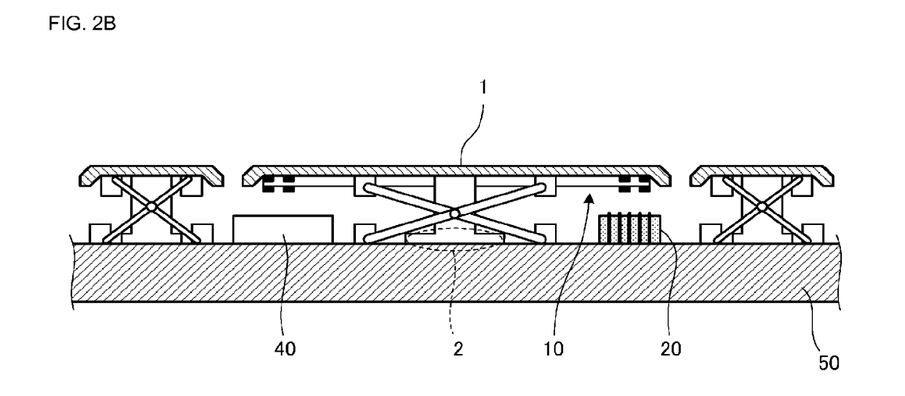
FIG. 2B is a cross-sectional view of key switches thereof.

FIG. 2A is a plan view of key-tops of the SPACE key and other different keys at the right and left sides of the SPACE key, and FIG. 2B is a cross-sectional view of key switches thereof. The SPACE key preferably includes the key-top 1, a mechanical portion configured to move the key-top 1 in the up-down direction, and a switch portion 2 configured to detect displacement of the key-top 1. Other key switches are also constituted by key-tops, mechanical portions, and switch portions in the same manner. These key switches are held on a substrate 50 or the like.

The coil antenna 10 is attached to the inner surface of the key-top 1. A power supply coil 20 and an RFIC 40 are mounted on the substrate 50 at a position hidden by the key-top 1.

Figure 3:
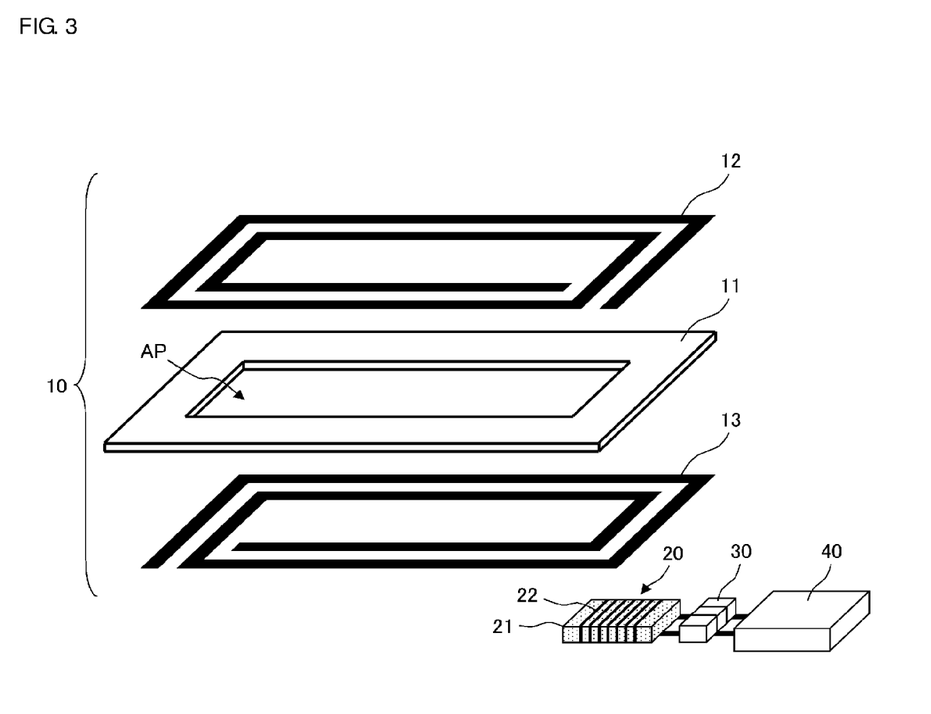

FIG. 3 is an exploded perspective view of a communication circuit that preferably includes the above-mentioned coil antenna 10, the power supply coil 20, the RFIC 40, and the like. The coil antenna 10 preferably includes a base film 11 and coil conductors 12 and 13 provided on both the surfaces of the base film 11. A rectangular or substantially rectangular opening AP is provided in the base film 11 and the coil conductors 12 and 13 are arranged so as to turn around the opening AP. The coil conductors 12 and 13 are conductors each of which is patterned in a rectangular or substantially rectangular spiral. The coil conductors 12 and 13 are patterned so as to be capacitively-coupled in a state where electric currents flow therethrough in the same direction when seen from the above. That is to say, the two coil conductors are patterned such that when a current in the clockwise direction flows through one coil conductor, a current in the clockwise direction also flows through the other coil conductor when seen from the above in the same direction.

As illustrated in FIG. 2A, the coil antenna 10 is bonded to the inner surface of the key-top 1 through an adhesive. The opening AP is provided in the base film 11 so that the coil antenna 10 does not interfere with an attachment mechanism of the key-top 1.

The power supply coil 20 preferably includes a ferrite core 21 and a coil conductor 22 wound around the ferrite core 21. The power supply coil 20 is arranged at a position at which magnetic flux passing through a coil axis of the coil conductor interlinks with the coil conductors 12 and 13 of the coil antenna 10.

A chip capacitor 30 that is connected to the coil conductor 22 in parallel is arranged between the RFIC 40 and the power supply coil 20.

Figure 4A:
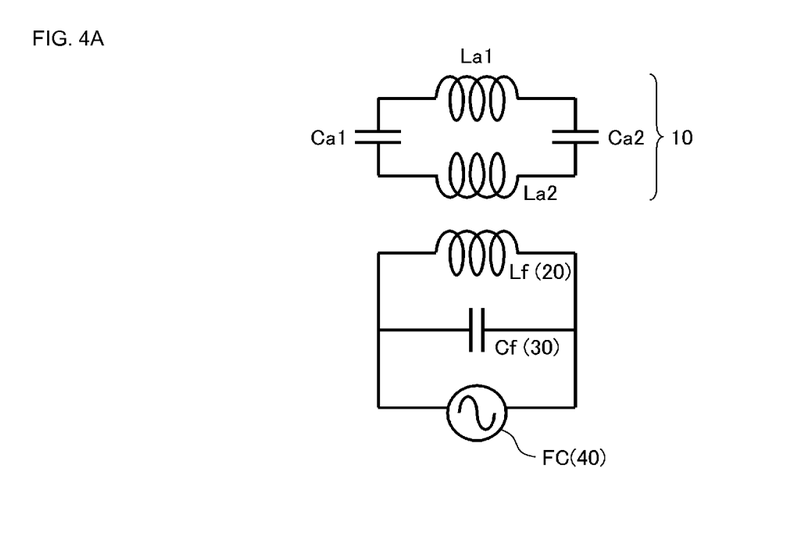
FIG. 4A is an equivalent circuit diagram of the communication circuit and FIG. 4B is an equivalent circuit diagram of another communication circuit having a different configuration in a matching circuit.

FIG. 4A is an equivalent circuit diagram of the above-mentioned communication circuit. The coil antenna 10 as illustrated in FIG. 4A preferably includes inductors La1 and La2 and capacitors Ca1 and Ca2. The inductors La1 and La2 correspond to the coil conductors 12 and 13 as illustrated in FIG. 3, respectively, and the capacitors Ca1 and Ca2 correspond to capacitances that are generated between the coil conductors 12 and 13. An inductor Lf corresponds to the power supply coil 20, a capacitor Cf corresponds to the chip capacitor 30, and a power supply circuit FC corresponds to the RFIC 40.

The capacitor Cf defines a resonance circuit together with the inductor Lf and acts as an element for resonance frequency adjustment and impedance matching.

Figure 4B:
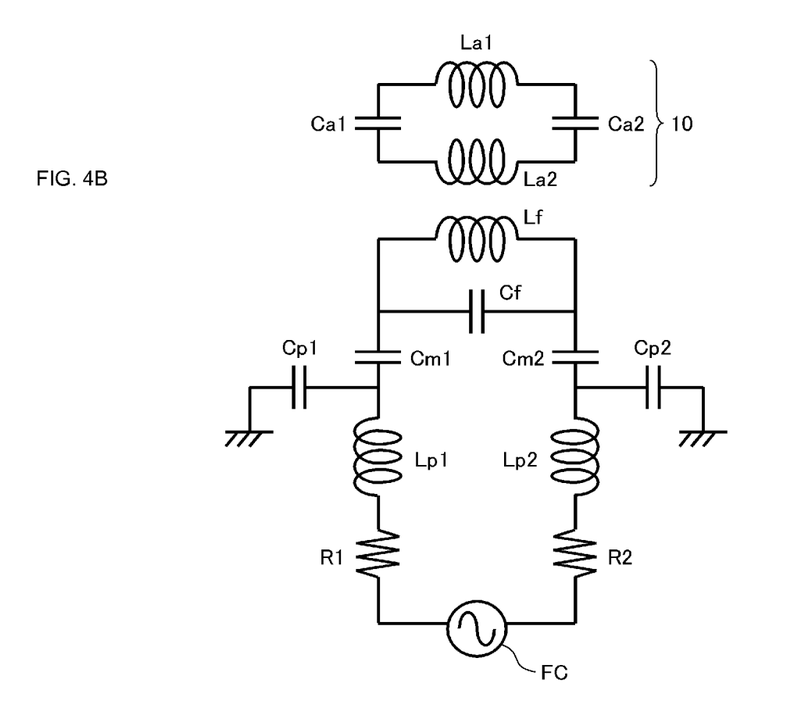

FIG. 4B is an equivalent circuit diagram of another communication circuit in which the configuration of a matching circuit is different from that of the above-mentioned circuit. A low pass filter defined by resistances R1 and R2, inductors Lp1 and Lp2, and capacitors Cp1 and Cp2 is provided between the inductor Lf and the power supply circuit FC. Further, capacitors Cm1 and Cm2 configured to perform matching preferably are provided between the low pass filter and the inductor Lf.

Thus, the coil antenna and the communication circuit including the coil antenna are provided on a portion of the key input unit. With this, communication with the NFC is made preferably by making a device including the NFC closer to the SPACE key as illustrated in FIG. 1A. Further, the tag of the RFID is made closer to the SPACE key so as to be read. In this case, the key input unit 101 is not covered by the housing 210 made of a metal, so that it is not influenced by the metal housing. The antenna is not required to be externally provided on the housing of the notebook PC. This prevents damage due to impact or the like and lowering in operability from occurring.

It should be noted that a magnetic sheet such as a ferrite sheet may be bonded to the rear surface of the coil antenna 10. This significantly reduces or prevents coupling between the coil antenna 10 and a metal member present under the coil antenna 10 or below the coil antenna 10 and in the vicinity thereof, thus avoiding a problem due to an eddy current. The coil antenna 10 in the vicinity of the power supply coil 20 preferably is exposed without being covered by the magnetic sheet in order to ensure magnetic coupling to the power supply coil 20. Alternatively, the thickness of the magnetic sheet preferably is reduced or a magnetic sheet having a relatively low magnetic permeability preferably is used.

Second Preferred Embodiment

Figure 5A:
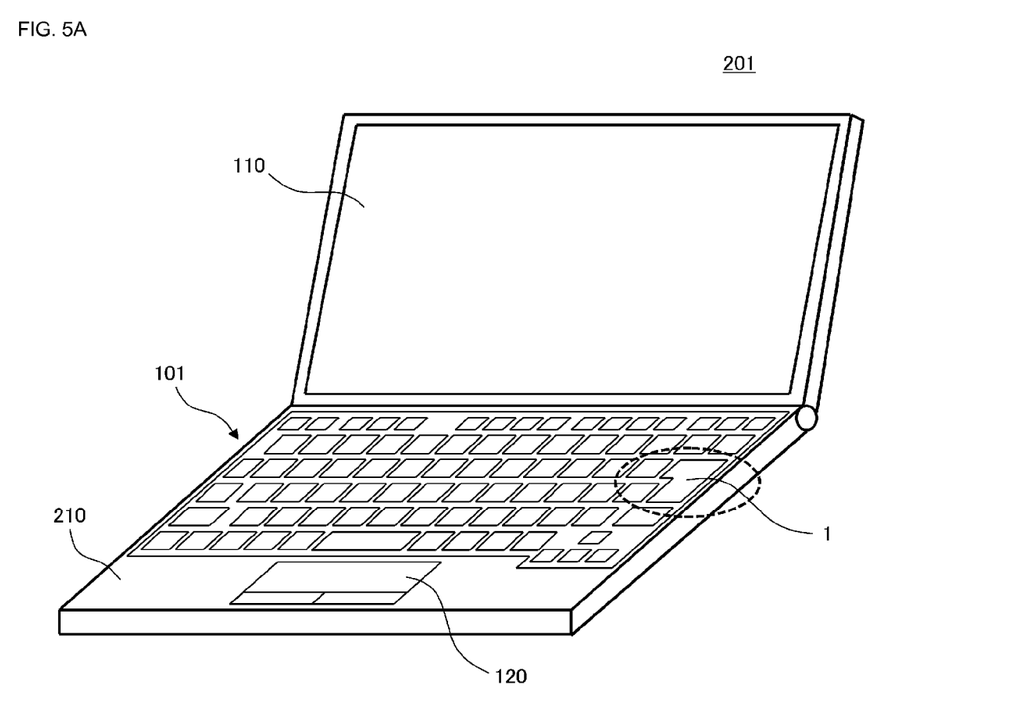
FIG. 5A is an outer perspective view of a notebook PC as an example of an electronic apparatus according to a second preferred embodiment of the present invention and FIG. 5B is a partial perspective view of a key input unit thereof.
Figure 5B:
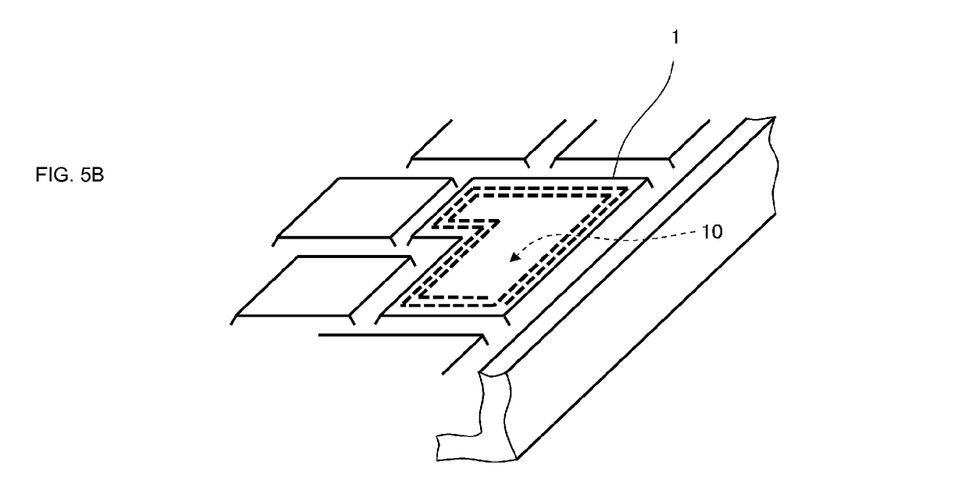

FIG. 5A is an outer perspective view of a notebook PC as an example of an electronic apparatus according to a second preferred embodiment of the present invention and FIG. 5B is a partial perspective view of a key input unit thereof. Although the coil antenna preferably is provided in the key-top of the SPACE key in the first preferred embodiment, the coil antenna 10 preferably is provided on the inner surface of the key-top 1 of an Enter key or a Return key in the second preferred embodiment.

Since the coil antenna is provided in the key-top having a size larger than the character keys as described above, the coil diameter of the coil antenna is large and a high gain is obtained.

Third Preferred Embodiment

Figure 6A:
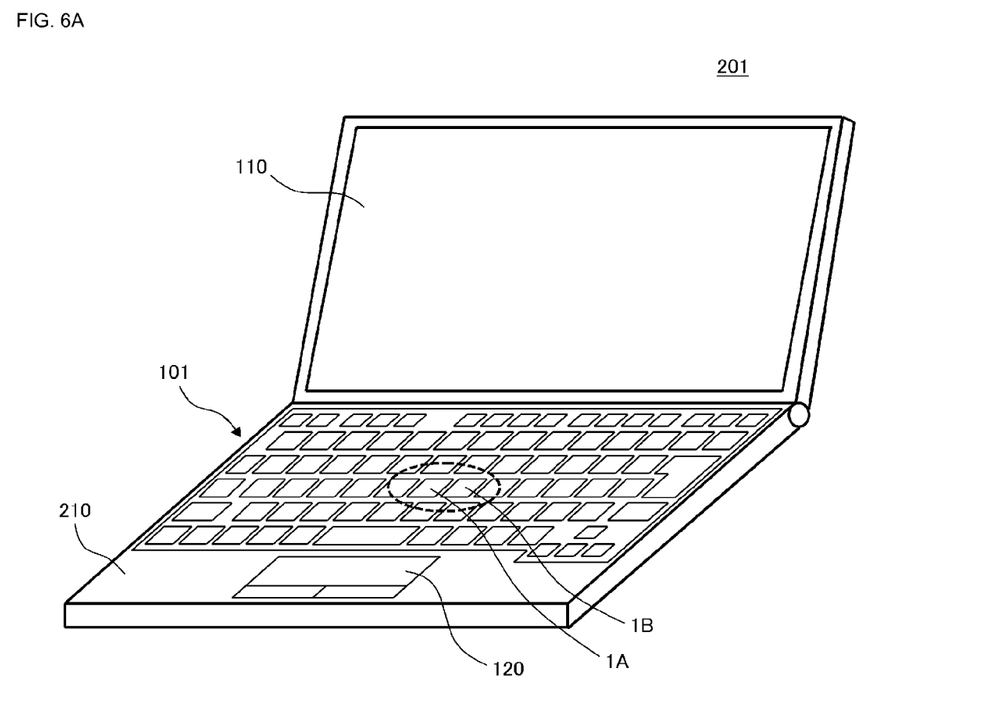
FIG. 6A is an outer perspective view of a notebook PC as an example of an electronic apparatus according to a third preferred embodiment of the present invention and FIG. 6B is a partial perspective view of a key input unit thereof.
Figure 6B:
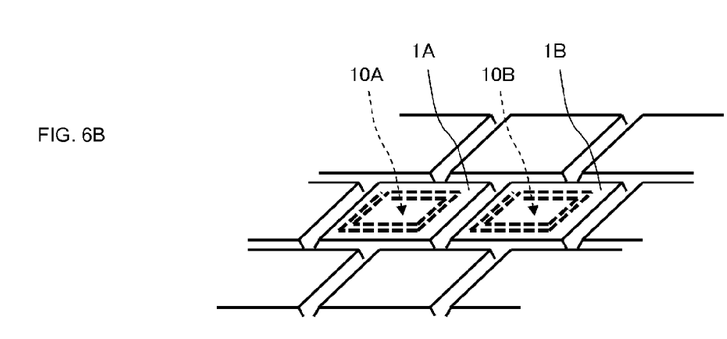

FIG. 6A is an outer perspective view of a notebook PC as an example of an electronic apparatus according to a third preferred embodiment of the present invention and FIG. 6B is a partial perspective view of a key input unit thereof. Although the coil antenna is provided in one key-top in the first and second preferred embodiments, the coil antennas are provided on the inner surfaces of two key-tops in the third preferred embodiment. As illustrated in FIG. 6B, coil antennas 10A and 10B are provided on the inner surfaces of key-tops 1A and 1B.

Figure 7:
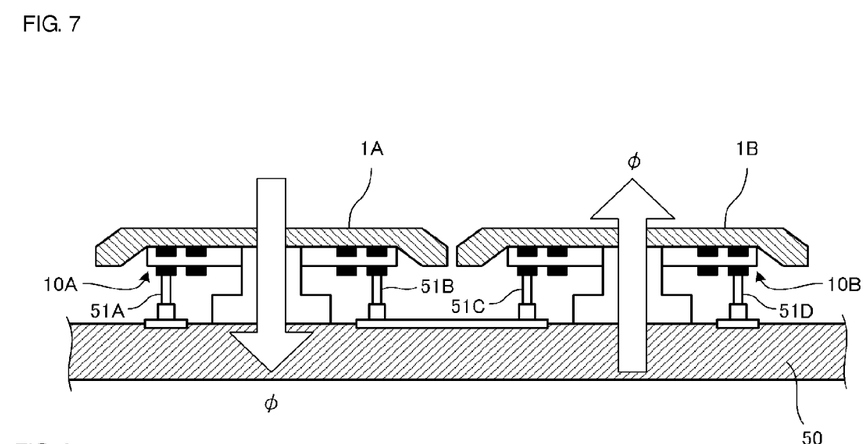
FIG. 7 is a cross-sectional view of two adjacent key switches.

FIG. 7 is a cross-sectional view of two adjacent key switches. Each of the coil antennas 10A and 10B preferably includes a base film and coil conductors having a predetermined number of turns, which are provided on both the surfaces of the base film. Spring pins 51A, 51B, 51C, and 51D are provided on the upper surface of the substrate 50. Both the ends of the coil conductor of the coil antenna 10A are connected to a conductive pattern on the substrate 50 through the spring pins 51A and 51B. In the same manner, both the ends of the coil conductor of the coil antenna 10B are connected to a conductive pattern on the substrate 50 through the spring pins 51C and 51D.

Figure 8:
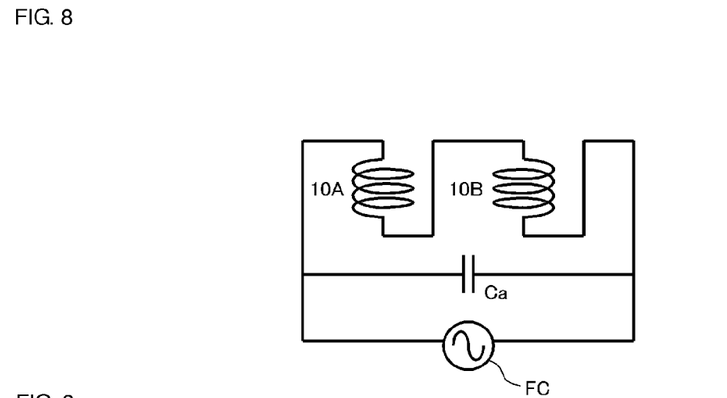
FIG. 8 is an equivalent circuit diagram of a communication circuit including two coil antennas as illustrated in FIG. 7.

FIG. 8 is an equivalent circuit diagram of a communication circuit including the two coil antennas as illustrated in FIG. 7. The coil antennas 10A and 10B define a series circuit, and a capacitor Ca and a power supply circuit FC are connected to the series circuit.

The two coil antennas 10A and 10B are wound and connected such that magnetic fields which are generated on the respective coil antennas have opposite phases. Magnetic fluxes φ in FIG. 7 indicate that the magnetic fields which are generated on the two coil antennas 10A and 10B have opposite phases to each other. With this, the magnetic fluxes passing through the two coil antennas 10A and 10B define a closed loop and strong magnetic coupling is generated by making a device as a communication party closer to the closed loop (closed magnetic path).

Fourth Preferred Embodiment

Figure 9:
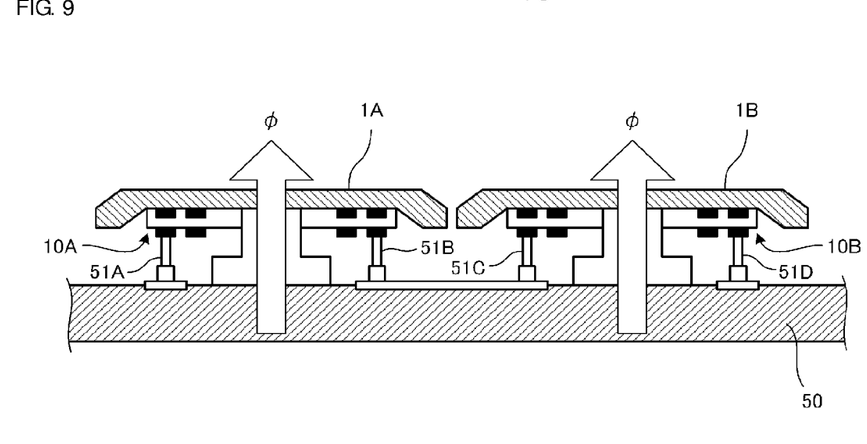
FIG. 9 is a cross-sectional view of two adjacent key switches that are provided on an electronic apparatus according to a fourth preferred embodiment of the present invention.

FIG. 9 is a cross-sectional view of two adjacent key switches that are provided on an electronic apparatus according to a fourth preferred embodiment of the present invention. Each of the coil antennas 10A and 10B preferably includes a base film and coil conductors having a predetermined number of turns, which are provided on both the surfaces of the base film. The spring pins 51A, 51B, 51C, and 51D are provided on the upper surface of the substrate 50. Both the ends of the coil conductor of the coil antenna 10A are connected to a conductive pattern on the substrate 50 through the spring pins 51A and 51B. In the same manner, both the ends of the coil conductor of the coil antenna 10B are connected to a conductive pattern on the substrate 50 through the spring pins 51C and 51D.

Figure 10A:
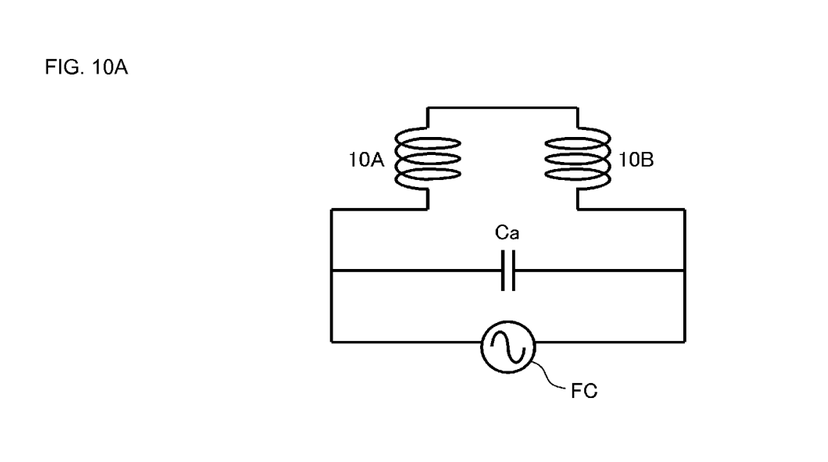
FIG. 10A is an equivalent circuit diagram of a communication circuit including the two coil antennas as illustrated in FIG. 9

FIG. 10A is an equivalent circuit diagram of a communication circuit including the two coil antennas as illustrated in FIG. 9. The coil antennas 10A and 10B define a series circuit and a capacitor Ca and a power supply circuit FC are connected to the series circuit.

The two coil antennas 10A and 10B are wound and connected such that magnetic fields which are generated on the respective coil antennas have the same phase. Magnetic fluxes φ in FIG. 9 indicate that the magnetic fields which are generated on the two coil antennas 10A and 10B have the same phase. With this, the magnetic fluxes passing through the two coil antennas 10A and 10B go in and out in the direction perpendicular or substantially perpendicular to the operation surface of the key input unit and a magnetic field spreads in a wide range. This makes it possible to make communication in a wide range in the surface direction.

Figure 10B:
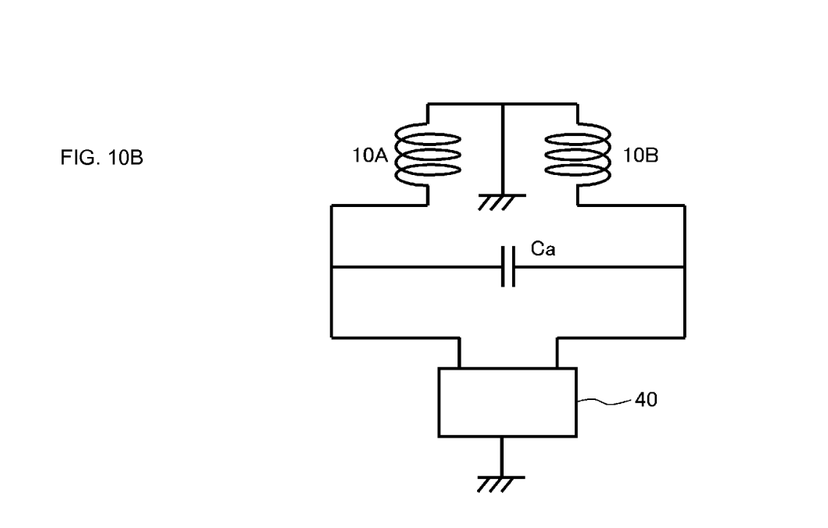
FIG. 10B is another equivalent circuit diagram of the communication circuit including the two coil antennas as illustrated in FIG. 9.

FIG. 10B is another equivalent circuit diagram of the communication circuit including the two coil antennas as illustrated in FIG. 9. In this example, the RFIC 40 includes two input/output ports respectively connected to one end of the coil antenna 10A and one of end of the coil antenna 10B, and a connecting point between the two coil antennas 10A and 10B is grounded. With this configuration, the communication circuit preferably is used as a communication circuit using the two coil antennas individually.

It should be noted that the two coil antennas are not limited to those connected in series and may be connected in parallel. Further, three or more coil antennas may be connected in series or in parallel for use, for example.

Fifth Preferred Embodiment

Figure 11A:
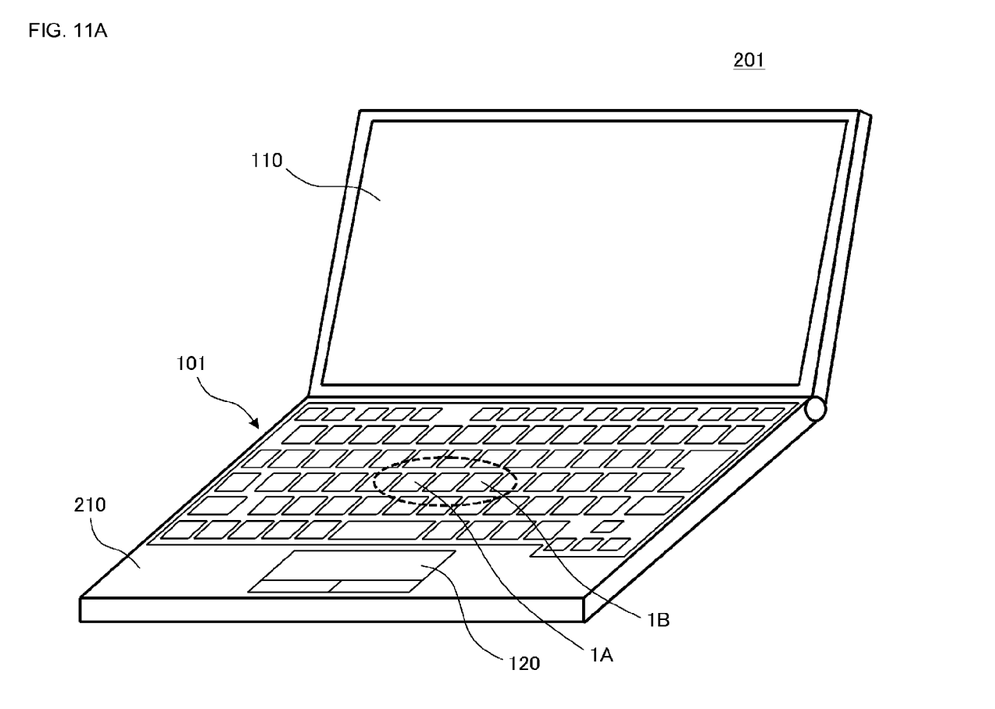
FIG. 11A is an outer perspective view of a notebook PC as an example of an electronic apparatus according to a fifth preferred embodiment of the present invention and FIG. 11B is a partial perspective view of a key input unit thereof.
Figure 11B:
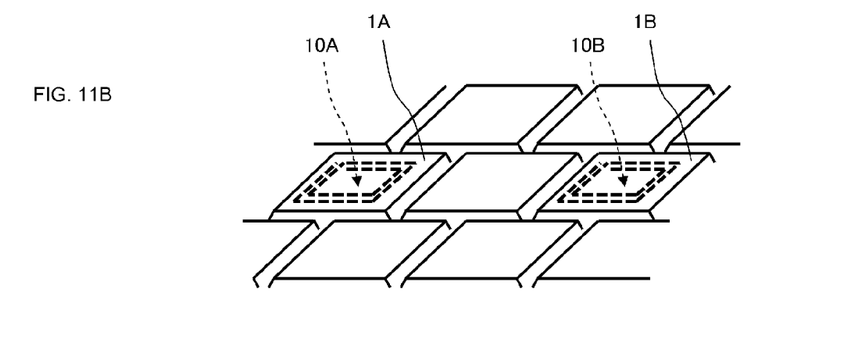

FIG. 11A is an outer perspective view of a notebook PC as an example of an electronic apparatus according to a fifth preferred embodiment of the present invention and FIG. 11B is a partial perspective view of a key input unit thereof. Although the coil antennas preferably are provided in two adjacent key-tops in the third and fourth preferred embodiments, the coil antennas are provided on the inner surfaces of two key-tops which are not positioned next to each other in the fifth preferred embodiment. As illustrated in FIG. 11B, the coil antennas 10A and 10B are provided on the inner surfaces of key-tops 1A and 1B.

Figure 12:
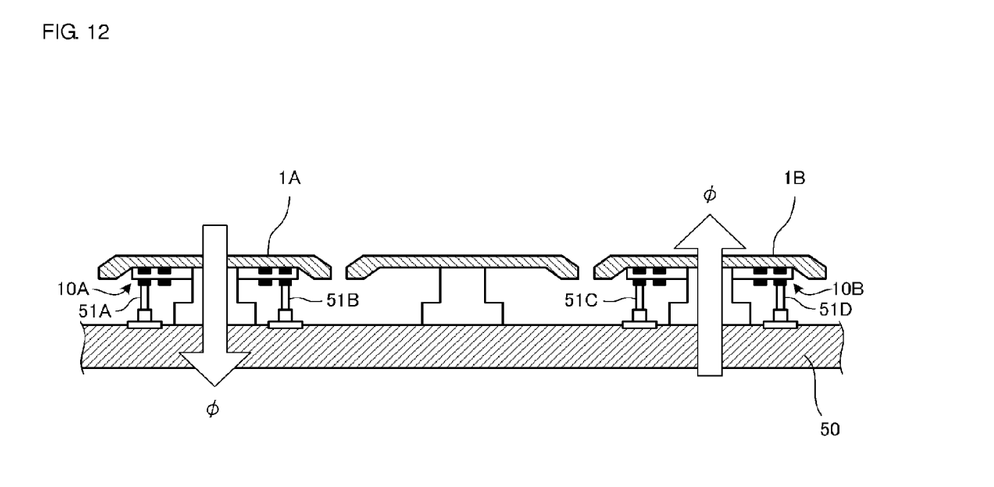
FIG. 12 is a cross-sectional view cut along a plane through two key switches.

FIG. 12 is a cross-sectional view cut along a plane through the above-mentioned two key switches. Each of the coil antennas 10A and 10B preferably includes a base film and coil conductors having a predetermined number of turns, which are provided on both the surfaces of the base film. Both the ends of the coil conductor of the coil antenna 10A are connected to a conductive pattern on the substrate 50 through the spring pins 51A and 51B. In the same manner, both the ends of the coil conductor of the coil antenna 10B are connected to a conductive pattern on the substrate 50 through the spring pins 51C and 51D.

The two coil antennas 10A and 10B are wound and connected such that magnetic fields which are generated on the respective coil antennas have opposite phases to each other. Magnetic fluxes φ in FIG. 12 indicate that the magnetic fields which are generated on the two coil antennas 10A and 10B have opposite phases to each other.

With this configuration, the magnetic fluxes passing through the two coil antennas 10A and 10B define a relatively large closed loop. This sets a larger range where a device as a communication party is to be made closer in the surface direction.

Sixth Preferred Embodiment

Figure 13A:
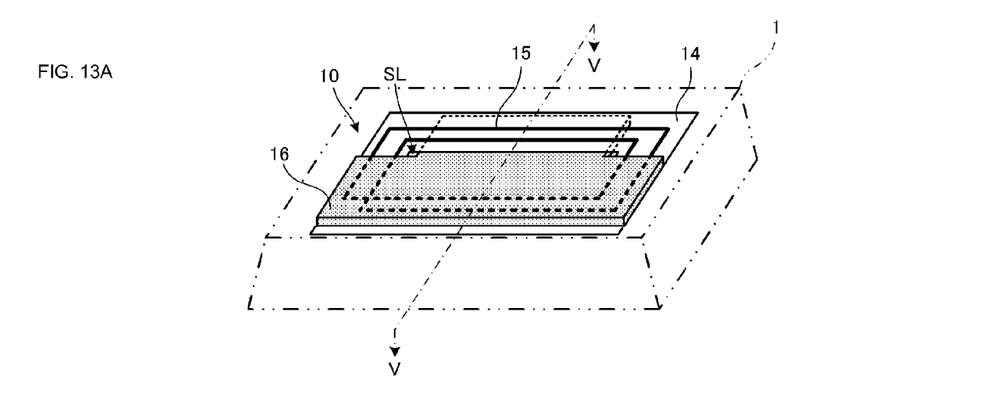
FIG. 13A is a perspective view illustrating the configuration of a coil antenna provided at the inside of a key-top of an electronic apparatus according to a sixth preferred embodiment and FIG. 13B is a cross-sectional view of a V-V portion of the coil antenna 10 in FIG. 13A.
Figure 13B:
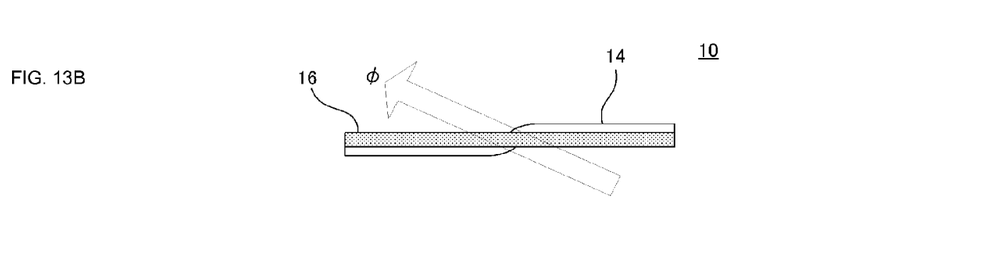

FIG. 13A is a perspective view illustrating the configuration of a coil antenna provided at the inside of a key-top of an electronic apparatus according to a sixth preferred embodiment of the present invention and FIG. 13B is a cross-sectional view of a V-V portion of the coil antenna 10 in FIG. 13A. The coil antenna 10 includes a base film 14 and a ferrite sheet 16. A slit SL is provided in the base film 14 and a spiral-form coil conductor 15 is provided around the slit SL. A starting end and a termination end of the coil conductor 15 are connected directly or through a capacitance. An inductance component and a capacitance component of the coil conductor 15 are defined so as to resonate in a frequency band to be used.

The ferrite sheet 16 is inserted into the slit SL of the base film 14. That is to say, a half of the ferrite sheet 16 is on the upper surface of the base film 14 and the other half is on the lower surface of the base film 14. The ferrite sheet defines and acts as a magnetic core of a coil conductor formed on the base film 14 or a magnetic path control sheet. Therefore, as illustrated in FIG. 13B, magnetic flux is inclined with respect to the coil axis of the coil conductor 15. This action inclines the direction of directivity with respect to the direction perpendicular or substantially perpendicular to the operation surface of the key input unit.

It should be noted that a power supply coil preferably is used so that the power supply coil is magnetically coupled to the coil antenna, for example. In this case, it is sufficient that the power supply coil is arranged at a position at which the power supply coil does not overlap with the ferrite sheet 16 when seen from the above. Alternatively, magnetic coupling preferably is achieved by the ferrite sheet 16.

Seventh Preferred Embodiment

Figure 14:
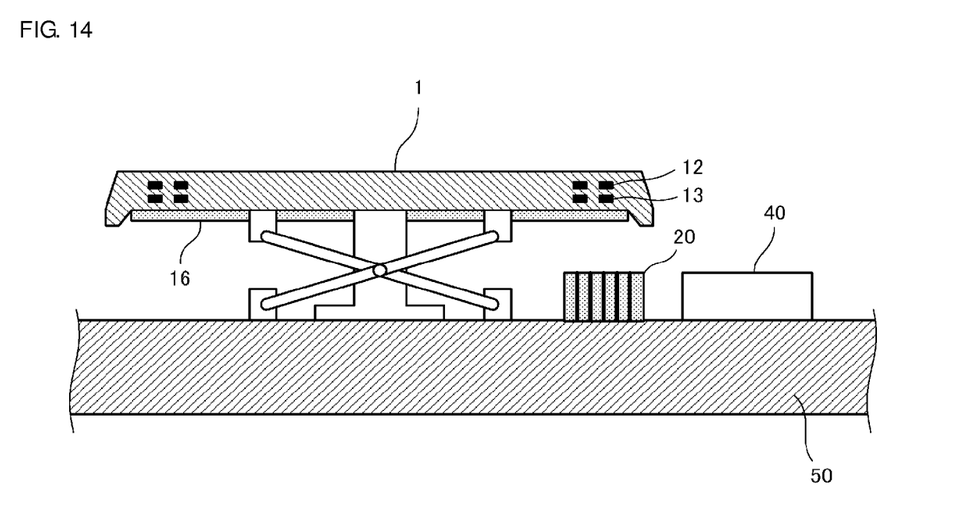
FIG. 14 is a cross-sectional view of one key switch portion of a key input unit of an electronic apparatus according to a seventh preferred embodiment of the present invention.

FIG. 14 is a cross-sectional view of one key switch portion of a key input unit of an electronic apparatus according to a seventh preferred embodiment of the present invention. In this example, the coil conductors 12 and 13 are integrally configured at the inside of the key-top 1. These coil conductors 12 and 13 define a coil antenna. The ferrite sheet 16 is bonded to the inner surface of the key-top 1. The power supply coil 20 and the RFIC 40 are mounted on the substrate 50. The power supply coil 20 is magnetically coupled to the coil antenna formed by the coil conductors 12 and 13. Other configurations thereof are the same as those in the first preferred embodiment.

When the power supply circuit is connected to the coil antenna directly without using the power supply coil 20, it is sufficient that they are electrically connected through spring pins as in the configuration illustrated in FIG. 7 and the like.

As described above, when the coil antenna is integrated with the key-top, the number of components and the number of processes in an assembling operation are significantly reduced.

In the above-mentioned examples, the coil conductor in a spiral configuration is explained. However, the coil conductor may preferably be configured in a one-turn loop, for example. Alternatively, the coil conductor may preferably be configured in a single layer.

In the above-mentioned preferred embodiments, the configuration of, in particular, the key input portion of the electronic apparatus is described using the notebook PC as an example. However, for example, various preferred embodiments of the present invention can be also applied to a single key input unit such as a keyboard that is USB-connected.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A key input unit comprising:
  a plurality of key switches each of which includes a key operating portion and a switch portion configured to detect displacement of the key operating portion; wherein
  at least one of the key operating portions of the plurality of key switches includes a coil antenna to which an RFIC is connected directly or indirectly; and
  the at least one of the key operating portions includes a key-top that defines an operation surface of the at least one of the key operating portions and the coil antenna is attached to an inner surface of the key-top.

2. The key input unit according to claim 1, wherein a winding axis of the coil antenna is perpendicular or substantially perpendicular to the operation surface of the key operating portion.

3. The key input unit according to claim 1, wherein the RFIC is arranged on a substrate on which the switch portions configured to detect operations of the key operating portions are provided.

4. The key input unit according to claim 1, further comprising a power supply coil which is connected to the RFIC and magnetically coupled to the coil antenna; wherein
the power supply coil is arranged on a substrate on which the switch portions configured to detect operations of the key operating portions are provided.

5. The key input unit according to claim 1, wherein the key operating portions include a plurality of character keys, and the key operating portion including the coil antenna is the key operating portion having a size larger than the character keys.

6. The key input unit according to claim 1, wherein each of a first key operating portion and a second key operating portion among the plurality of key operating portions includes the coil antenna, and the first key operating portion and the second key operating portion are connected in series or in parallel.

7. The key input unit according to claim 6, wherein the coil antenna of the first key operating portion and the coil antenna of the second key operating portion are wound and connected such that magnetic fields which are generated on the respective coil antennas have the same phase.

8. An electronic apparatus comprising:
a display portion; and
the key input portion according to claim 1.

9. The electronic apparatus according to claim 8, wherein a winding axis of the coil antenna is perpendicular or substantially perpendicular to the operation surface of the key operating portion.

10. The electronic apparatus according to claim 8, wherein the RFIC is arranged on a substrate on which the switch portions configured to detect operations of the key operating portions are provided.

11. The electronic apparatus according to claim 8, further comprising a power supply coil which is connected to the RFIC and magnetically coupled to the coil antenna; wherein
the power supply coil is arranged on a substrate on which the switch portions configured to detect operations of the key operating portions are provided.

12. The electronic apparatus according to claim 8, wherein the key operating portions include a plurality of character keys, and the key operating portion including the coil antenna is the key operating portion having a size larger than the character keys.

13. The electronic apparatus according to claim 8, wherein each of a first key operating portion and a second key operating portion among the plurality of key operating portions includes the coil antenna, and the first key operating portion and the second key operating portion are connected in series or in parallel.

14. The electronic apparatus according to claim 13, wherein the coil antenna of the first key operating portion and the coil antenna of the second key operating portion are wound and connected such that magnetic fields which are generated on the respective coil antennas have the same phase.

15. The key input unit according to claim 1, wherein the RFIC is arranged in a device which the switch portions are provided on.

16. The key input unit according to claim 1, wherein the coil antenna is wound around the switch portion of the at least one of the key operating portions.

* * * * *